United States Patent
Khenkin et al.

(10) Patent No.: US 9,503,828 B2
(45) Date of Patent: Nov. 22, 2016

(54) SOUND BASES NAVIGATION USING A PORTABLE COMMUNICATIONS DEVICE

(71) Applicant: INVENSENSE, INC., San Jose, CA (US)

(72) Inventors: Aleksey S. Khenkin, Nashua, NH (US); Fariborz Assaderaghi, Emerald Hills, CA (US)

(73) Assignee: INVENSENSE, INC., San Jose, CA (US)

(*) Notice: Subject to any disclaimer, the term of this patent is extended or adjusted under 35 U.S.C. 154(b) by 151 days.

(21) Appl. No.: 14/478,158

(22) Filed: Sep. 5, 2014

(65) Prior Publication Data

US 2016/0073207 A1 Mar. 10, 2016

(51) Int. Cl.
*H04R 29/00* (2006.01)
*H04R 1/08* (2006.01)

(52) U.S. Cl.
CPC .............. *H04R 29/00* (2013.01); *H04R 1/08* (2013.01)

(58) Field of Classification Search
None
See application file for complete search history.

(56) References Cited

U.S. PATENT DOCUMENTS

| | | | | |
|---|---|---|---|---|
| 7,352,652 | B2* | 4/2008 | Holm | G01S 5/0081 367/128 |
| 9,294,872 | B2* | 3/2016 | Callahan | G06Q 30/02 |
| 2006/0221769 | A1* | 10/2006 | Van Loenen | G01S 11/14 367/99 |
| 2009/0251996 | A1* | 10/2009 | Dijk | G01S 5/22 367/127 |
| 2012/0087212 | A1* | 4/2012 | Vartanian | G01S 15/08 367/118 |

OTHER PUBLICATIONS

Turner, "Watertight Floor Plans Generated from Laser Range Data". Electrical Engineering and Computer Sciences, University of California at Berkeley, Technical Report No. UCB/EECS-2013-69, May 15, 2013, 19 pages.
"About Indoor Maps". Retrieved on Nov. 21, 2014, 3 pages.
"From Navigation to Preservation: Indoor Mapping Technology Evolves", Oct. 14, 2013, 5 pages.
"Go inside with Indoor Maps". Retrieved on Jul. 31, 2014, 6 pages.

* cited by examiner

*Primary Examiner* — Paul Huber
(74) *Attorney, Agent, or Firm* — Amin, Turocy & Watson, LLP

(57) ABSTRACT

Sound based navigation using a portable communications device is presented herein. A portable communications device can include a speaker for generating a sound, and microphone(s) for receiving a reflection of the sound—the reflection including an acoustic wave that has been reflected from an object. Further, the portable communications device can include a timing component configured to determine a time of propagation of the acoustic wave from the speaker to the microphone(s), and a distance component configured to determine a distance of the object from the portable communications device based on the time of propagation of the acoustic wave. Furthermore, the portable communications device can include a mapping component configured to: determine a geographic location of the portable communications device, and create, based on the geographic location and the distance of the object from the portable communications device, a map, indoor map, etc. of objects, structures, etc. comprising the object.

24 Claims, 12 Drawing Sheets

SOUND BASES NAVIGATION USING A PORTABLE COMMUNICATIONS DEVICE

TECHNICAL FIELD

This disclosure generally relates to embodiments for sound based navigation using a portable communications device.

BACKGROUND

Conventional indoor mapping technologies utilize floor plans, laser scanning, cameras to build indoor maps of structures. However, such technologies have had some drawbacks, some of which may be noted with reference to the various embodiments described herein.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
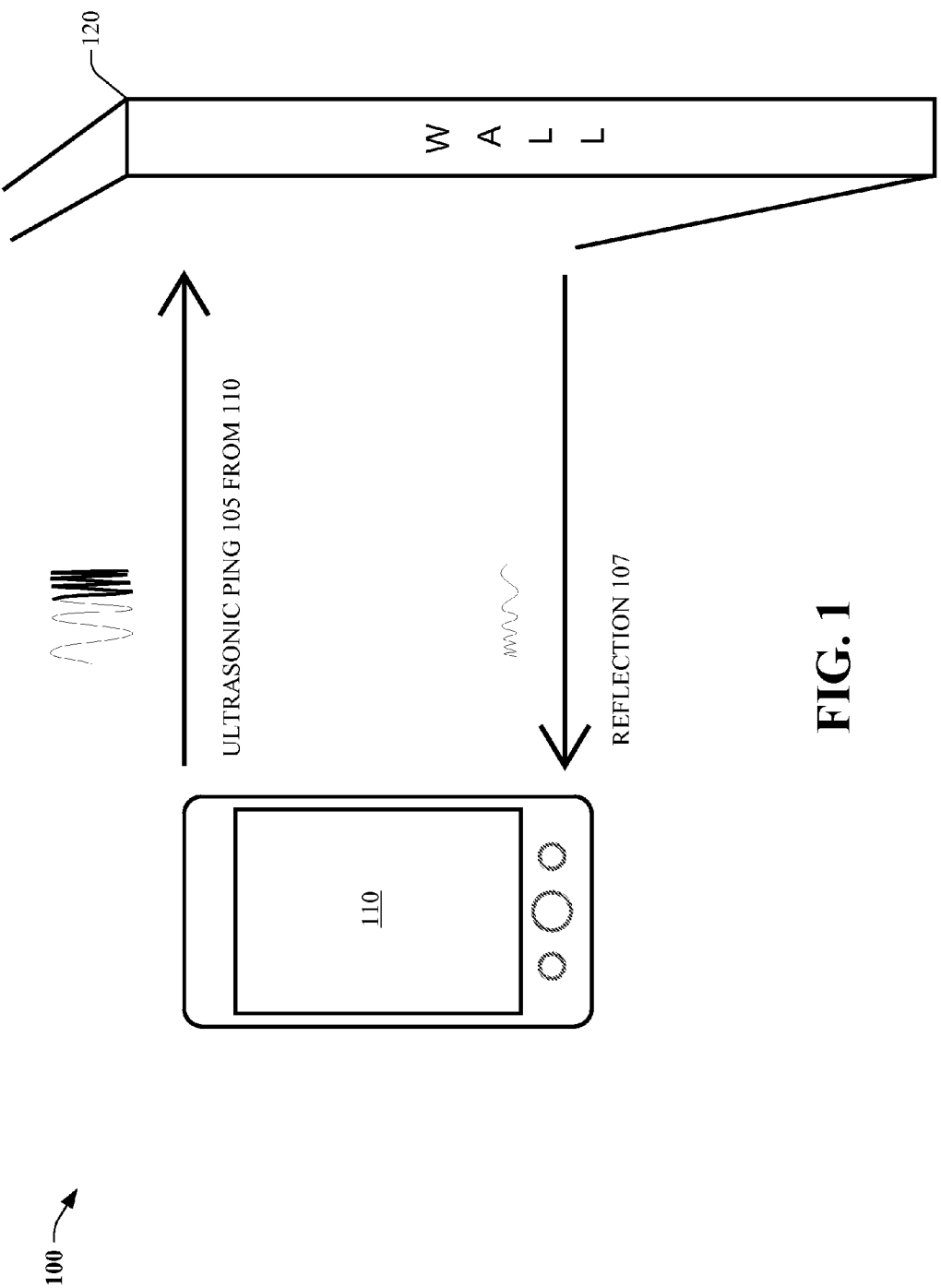
FIGS. 1-2 illustrate block diagrams of sound based navigation environments, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional indoor mapping technologies utilize floor plans, laser scanning, cameras to build indoor maps of structures. Consequently, such technologies inefficiently build indoor maps by utilizing manual input sources. Various embodiments disclosed herein improve the creation of indoor maps by utilizing existing hardware, e.g., speaker, microphone(s), from portable communication devices to acoustically create a map of objects and/or structures.

For example, a portable communications device, e.g., wireless device, cellular device, smart phone, hand held device, can include a speaker for generating, emitting, transmitting a sound, e.g., an ultrasonic sound including frequencies above a human audible range of frequencies (e.g., above 20,000 Hz), an audible sound, e.g., ring, alarm, noise associated with a key press of the portable communication device, which is within the human audible range of frequencies (e.g., at or below 20,000 Hz), and microphone(s) for receiving a reflection of the sound, an early reflection of the sound, an echo of the sound, e.g., an acoustic wave that has been reflected from an object, e.g., wall or structure. Further, the portable communications device can include a timing component configured to determine a time of propagation of the acoustic wave from the speaker to the microphone(s), and a distance component configured to determine a distance of the object from the portable communications device based on the time of propagation of the acoustic wave.

In one embodiment, the timing component can send first information associated with a transmission of the sound and the reflection of the sound to a system, e.g., cloud-based system, of a cloud computing environment, communication network, e.g., Internet, and receive, based on the first information, second information from the cloud-based system. In this regard, the timing component can offload computation of distance information to the cloud-based system, and the cloud-based system can determine the second information by aggregating, averaging location and distance information from multiple portable communication devices. For example, the cloud-based system can correlate data referencing an average GPS location and/or position of the object, based on reported distances of the object from respective portable communication devices. In this regard, by correlating data referencing an average GPS location and/or position of the object, the system can reduce uncertainty of GPS measurements, reduce uncertainty due to movement of objects, reduce uncertainty due to temporarily located objects. Further, the timing component can determine, based on the second information, the time of propagation of the acoustic wave. In an embodiment, the second information can represent the time of propagation of the acoustic wave.

In another embodiment, the portable communications device can include a mapping component configured to determine a geographic location of the portable communications device, e.g., based on Global Positioning System (GPS) information determined, received by the portable communications device, and create, based on the geographic location and the distance of the object from the portable communications device, a map of objects, e.g., indoor map, comprising structures, e.g., walls, objects, comprising the object.

In yet another embodiment, the mapping component can be configured to receive distance information representing distances of the object from geographic locations of other portable communication devices, and create, based on the distance information, the map of objects. In this regard, the mapping component can correlate information of other devices regarding a GPS position of the object to more accurately create the map of objects, for example, by averaging measurement values, by averaging GPS determined positions to reduce error, to reduce uncertainty of GPS measurements, to reduce uncertainty due to movement of objects, to reduce uncertainty due to temporarily located objects.

In an embodiment, the mapping component can be configured to determine an orientation, e.g., x-axis based orientation, y-axis based orientation, z-axis based orientation, of the portable communications device, e.g., using accelerometer(s), gyroscope(s), of the portable communications device, and build, based on the orientation, a three-dimensional (3-D) map of the objects. In this regard, the 3-D map of objects can detail the height of structures and/or detail openings within the structures. In one embodiment, the mapping component can be configured to determine, based on the orientation, a direction of the reflection of the sound. In this regard, the mapping component can be configured to build the 3-D map of objects based on the determined direction of the reflection of the sound.

In another embodiment, the mapping component can be configured to utilize mapping data derived from other sources, e.g., building blueprints, to augment the map of objects, 3-D map of objects. In yet another embodiment, the mapping component can be configured to augment the mapping data, e.g., building blueprints, utilizing information from the map of objects.

Another embodiment can include a portable communications device, e.g., wireless device, cellular device, smart phone, hand held device, that can include a speaker, a microphone, a memory to store executable instructions, and a processor, coupled to the memory, that facilitates execution of the executable instructions to perform operations, comprising: determining a transmit time that a sound, e.g., an ultrasonic sound including frequencies above a human audible range of frequencies (e.g., above 20,000 Hz), an audible sound that is within the human audible range of frequencies (e.g., at or below 20,000 Hz), which has been generated, emitted, transmitted by the speaker, e.g., as a ring, as an alarm, as a noise associated with a key press of the portable communications device, and/or that has been generated, emitted, transmitted by a sound source without the portable communications device, e.g., generated by the sound source around, near, proximate to, the portable communications device, e.g., comprising human speech. In this regard, in an embodiment, the determining the transmit time can include determining, using the microphone, a time that the sound has been generated by the sound source around, near, proximate to the portable communications device.

In yet another embodiment, the operations can further include determining a receive time, arrival time that a reflection, echo, early reflection of the sound off of an object, e.g., wall, structure, plumbing, has been received by the microphone, and determining, based on the transmit time and the receive time, a distance of the object from the portable communications device.

In an embodiment, the operations can further include determining a geographic location of the portable communications device, e.g., based on Global Positioning System (GPS) information determined, received, by the portable communications device, and creating, based on the geographical location and the distance of the object from the portable communications device, a map of objects, e.g., indoor map, comprising structures, e.g., walls, comprising the object.

In one embodiment, the creating the map of objects can include determining an orientation, e.g., x-axis based orientation, y-axis based orientation, z-axis based orientation, of the portable communications device, e.g., using accelerometer(s), gyroscope(s), of the portable communications device, and building, based on the orientation, a three-dimensional (3-D) map of the objects. In this regard, the map of objects can detail the height of structures and/or detail openings within the structures. In another embodiment, the operations can further include determining a direction of the reflection of the sound using the determined orientation of the portable communications device, and building, based on the determined direction of the reflection of the sound, the 3-D map of the objects.

Yet another embodiment can include a system, e.g., cloud-based system, of a communication network, e.g., Internet. The system can include a memory to store executable instructions, and a processor, coupled to the memory, that facilitates execution of the executable instructions to perform operations, e.g., utilizing a time component and a distance component. The time component can be configured to determine an emission time that a sound, e.g., comprising frequencies above a human audible range of frequencies (e.g., above 20,000 Hz), comprising frequencies within the human audible range of frequencies (e.g., within 20-20,000 Hz), has been emitted by a speaker of a portable communications device and/or generated, emitted, transmitted by a sound source around, about, proximate to the portable communications device, and determine a reception time at which a reflection, early reflection, echo of the sound off of an object, e.g., structure or wall, has been received by the portable communications device. The distance component can be configured to determine, based on the emission time and the reception time, a distance of the object from the portable communications device. In an embodiment, the time component can receive information corresponding to, representing the emission time and the reception time from the portable communications device.

In one embodiment, the system can further include a mapping component configured to determine a geographic location of the portable communications device, e.g., based on Global Positioning System (GPS) information determined, received, by the mapping component, and create, based on the geographic location and the distance of the object from the portable communications device, a map of objects, e.g., indoor map, comprising structures, e.g., walls, plumbing, appliances, comprising the object.

In another embodiment, the mapping component can be configured to determine an orientation, e.g., x-axis orientation, y-axis orientation, z-axis based orientation, of the portable communications device, e.g., using data from accelerometer(s), gyroscope(s), of the portable communications device, and build, based on the orientation, a 3-D map of the objects. In this regard, the 3-D map of objects can detail the height of structures and/or detail openings within the structures. In an embodiment, the mapping component can be configured to determine, based on the orientation, a direction of the reflection of the sound, and build, based on the determined direction, the 3-D map of the objects.

In yet another embodiment, the mapping component can be configured to utilize mapping data derived from other sources, e.g., building blueprints, to augment the map of objects and/or the 3-D map of objects. In an embodiment, the mapping component can be configured to augment the mapping data, e.g., building blueprints, utilizing information from the map of objects.

In one embodiment, the system can further include a correlation component configured to receive location information, e.g., GPS based information, representing geographical locations of portable communication devices, e.g., wireless device(s), cellular device(s), smart phone(s), hand held device(s), comprising the portable communications device. Further, the correlation component can be configured to receive distance information representing respective distances of the portable communication devices from the object. In this regard, the correlation component can derive, determine correlated data referencing an average GPS location, average position of the object based on the reported distances of the object from respective portable communication devices, e.g., reducing uncertainty of GPS measurements, reducing uncertainty due to movement of objects, reducing uncertainty due to temporarily located objects. Further, the mapping component can be configured to create the map of the objects based on the location information and the correlated data.

Yet another embodiment can include a method including determining, by a system comprising a processor, e.g., by a cloud-based system of a communication network, e.g., Internet, a first determined time of an emission of a sound, e.g., comprising frequencies above a human audible range of frequencies, comprising frequencies within the human audible range of frequencies, which has been generated, emitted by a portable communications device, e.g., wireless device, cellular device, smart phone, hand held device, and/or that has been generated, emitted by a sound source, e.g., person, which is around, near the portable communications device, e.g., and that has been detected via microphone(s) of the portable communications device. Further, the method can include determining, by the system, a second determined time of a reflection, early reflection, echo of the sound off of an object, e.g., structure, wall, plumbing, which has been received, detected by the portable communications device, and determining, by the system, based on the first determined time and the second determined time, a distance of the object from the portable communications device.

In an embodiment, the method can include creating, by the system based on the distance, a map of objects, e.g., indoor map, comprising structures, e.g., plumbing, appliances, comprising the object. In one embodiment, the method can include receiving, by the system, location information, e.g., GPS based information representing geographical locations of portable communication devices comprising the portable communications device; receiving, by the system, distance information representing distances of the objects from the portable communication devices; and creating, by the system based on the location information and the distance information, a map of the objects. In this regard, the method can correlate information of other devices regarding a GPS position of the object to more accurately create the map of objects, e.g., averaging measurement values, averaging GPS determined positions, to reduce error, to reduce uncertainty of GPS measurements, to reduce uncertainty due to movement of objects, to reduce uncertainty due to temporarily located objects.

In another embodiment, the method can include determining, by the system, an orientation, e.g., x-axis based orientation, y-axis based orientation, z-axis based orientation, of the portable communications device, e.g., using accelerometer(s), gyroscope(s), of the portable communications device, and building, by the system based on the orientation, a 3-D map of the objects. In one embodiment, the method can include determining, by the system based on the orientation, a direction of the reflection of the sound. Further, the method can include building, by the system based on the determined direction of the reflection of the sound, the 3-D map of the objects.

In yet another embodiment, the method can include augmenting by the system, modifying by the system the map of objects and/or the 3-D map of objects utilizing mapping data derived from other sources, e.g., building blueprints. In one embodiment, the method can include augmenting by the system, modifying by the system the mapping data, e.g., the building blueprints, utilizing information from, e.g., the map of objects, the 3-D map of objects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the word "exemplary", "example", and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art of sound based navigation technologies.

Figure 2:
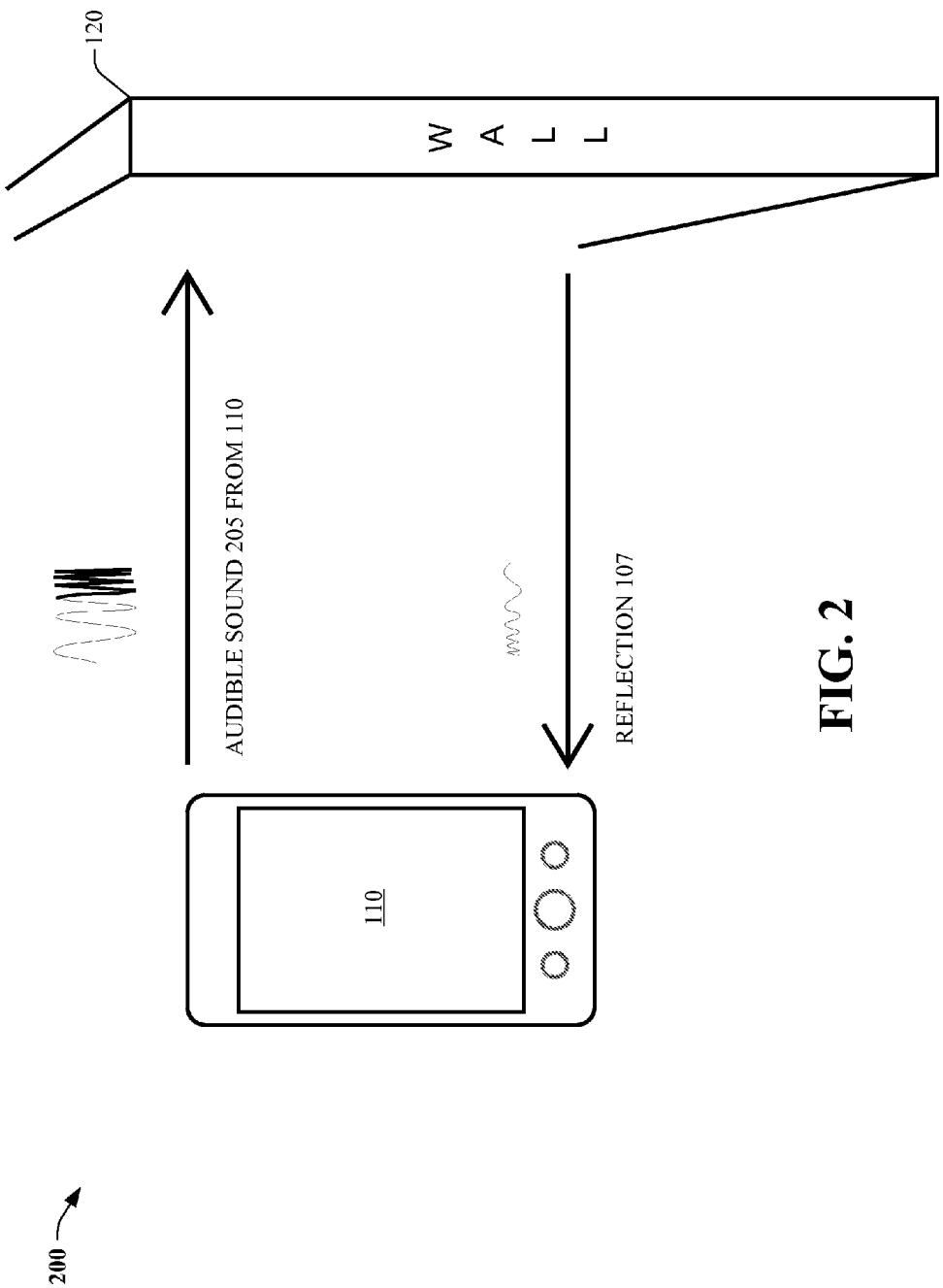
Figure 3:
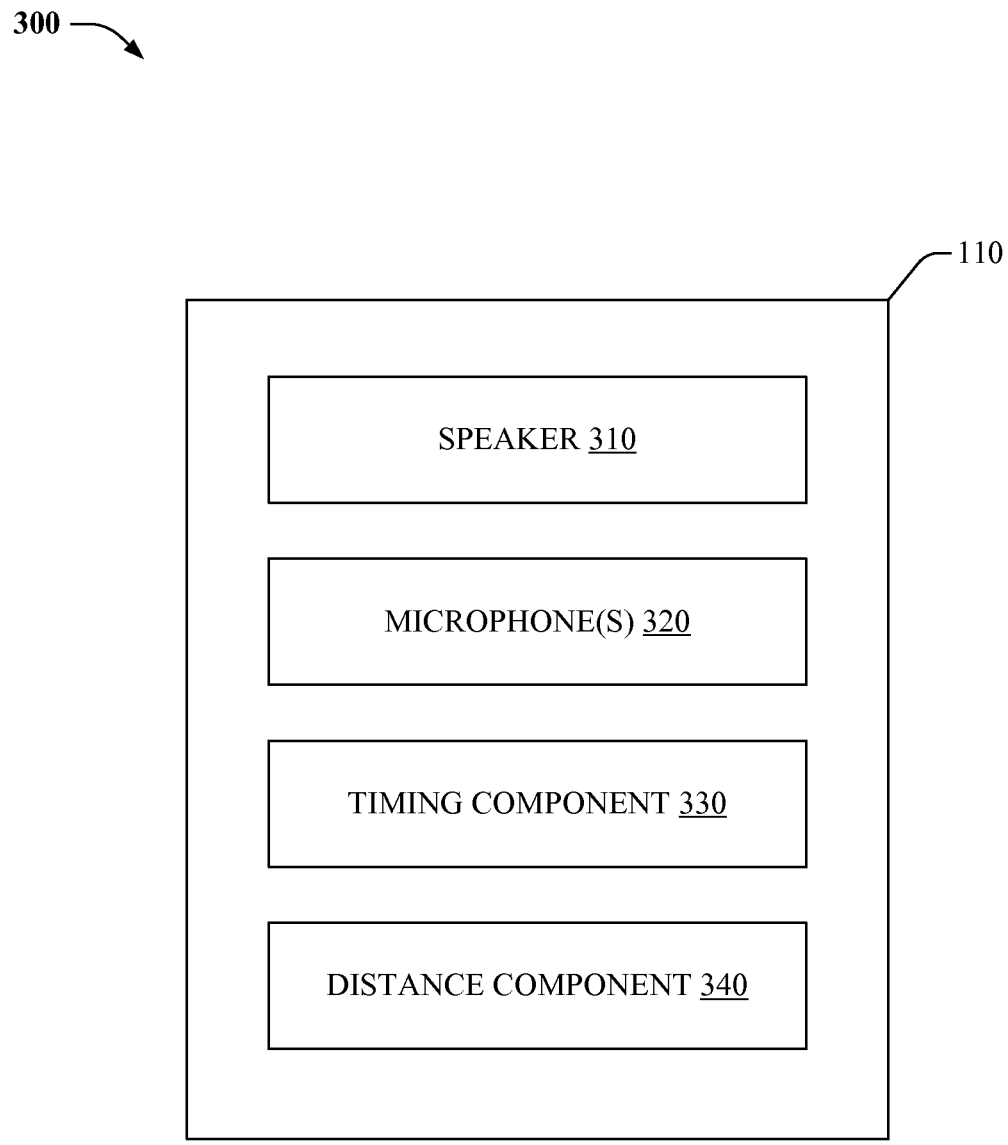
FIG. 3 illustrates a block diagram of a portable communications device, in accordance with various embodiments.

Referring now to FIGS. 1-3, block diagrams (100, 200, and 300) of sound based navigation environments and a portable communications device are illustrated, respectively, in accordance with various embodiments. Portable communications device 110, e.g., a wireless device, cellular device, smart phone, hand held device, includes speaker 310 for generating, emitting, transmitting a sound, e.g., an ultrasonic sound, ultrasonic ping 105, including frequencies above a human audible range of frequencies (e.g., above 20,000 Hz), and/or an audible sound, e.g., audible sound 205, ring, alarm, noise associated with a key press of the portable communication device, which is within the human audible range of frequencies (e.g., at or below 20,000 Hz). Further, portable communications device 110 includes microphone(s) 320 for receiving a reflection, early reflection, echo of the sound, e.g., an acoustic wave, reflection 107, which has been reflected from an object, e.g., structure, appliance, wall 120.

Portable communications device 110 further includes timing component 330 that can be configured to determine a time of propagation of the acoustic wave from speaker 310 to microphone(s) 320, and distance component 340 that can be configured to determine a distance of the object from portable communications device 110 based on the time of propagation of the acoustic wave.

In one embodiment, timing component 330 can send first information associated with a transmission of the sound and the reflection of the sound directed to a system, e.g., a cloud-based system, system 905 (see below), of a communication network, e.g., Internet, and receive, based on the first information, second information from the system. In this regard, timing component 330 can offload computation of distance information to the system, cloud-based system which can determine the second information by aggregating, averaging location and distance information from multiple portable communication devices. For example, the cloud-based system can correlate data referencing an average GPS location, an average position of the object-based on distances of the object from respective portable communication devices, e.g., reducing uncertainty of GPS measurements, reducing uncertainty due to movement of objects, reducing uncertainty due to temporarily located objects. Further, timing component 330 can determine, based on the second information, the time of propagation of the acoustic wave from speaker 310 to microphone(s) 320. In an embodiment, the second information can represent the time of propagation of the acoustic wave.

Figure 4:
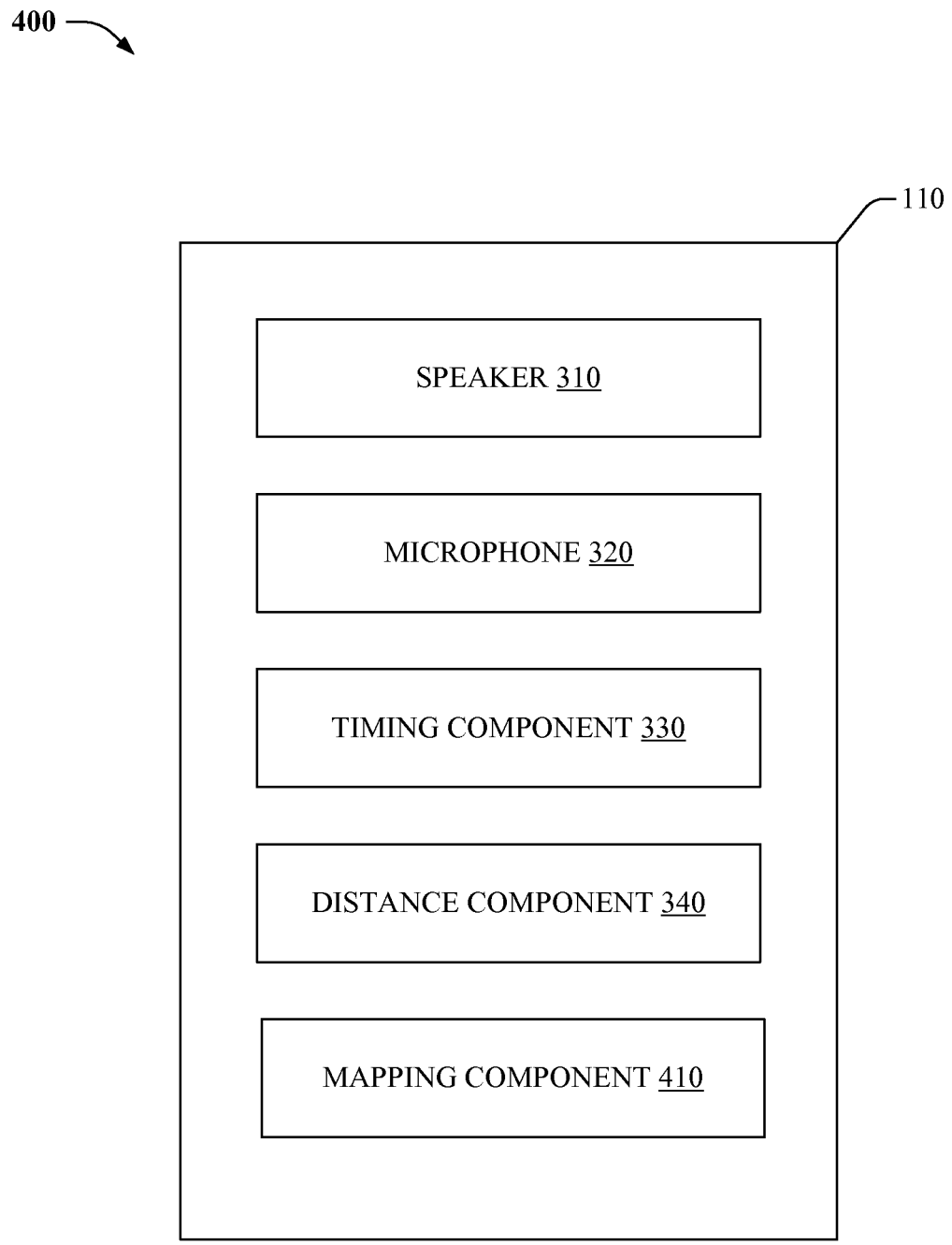
FIG. 4 illustrates a block diagram of a portable communications device including a mapping component, in accordance with various embodiments.
Figure 5:
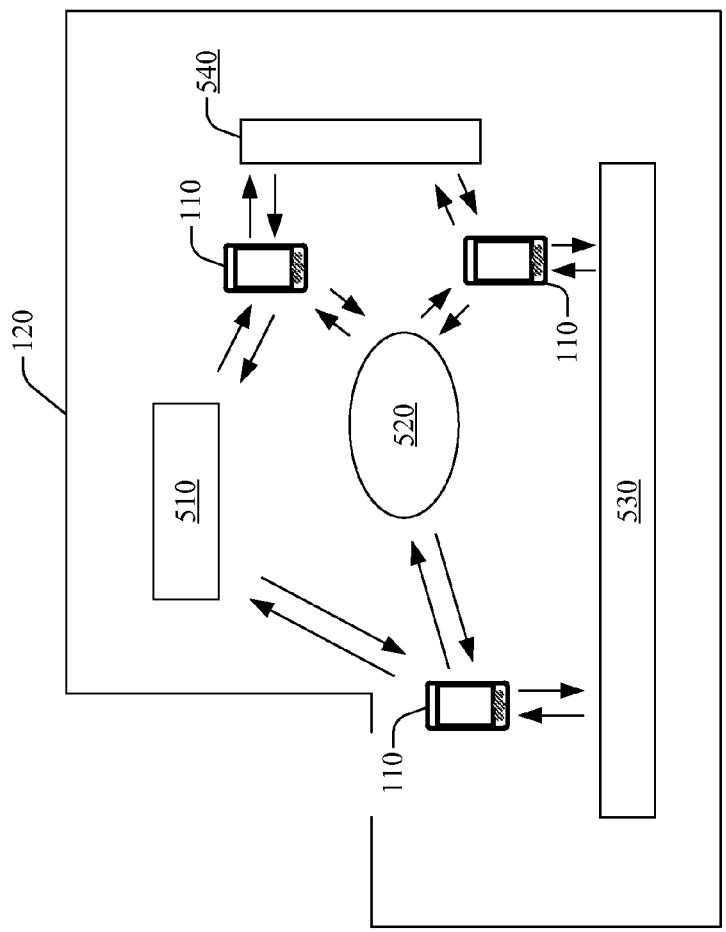
FIG. 5 illustrates a block diagram of a map of objects, in accordance with various embodiments.

As illustrated by FIGS. 4 and 5, portable communications device 110 can further include mapping component 410, which can be configured to determine a geographic location of portable communications device 110, e.g., based on GPS information, coordinate information, time information, determined, received by portable communications device 110, and create, based on the geographic location and the distance of the object from portable communications device 110, map of objects 500, e.g., an indoor map, comprising structures, e.g., walls, objects, plumbing, appliances comprising the object, e.g., wall 120, and other objects, e.g., object 510, object 520, object 530, object 540. In another embodiment, mapping component 410 can be configured to receive distance information representing distances of the object, the other objects from geographic locations of other portable communication devices (e.g., 110, 610 (see below)), and create, based on the distance information, map of objects 500. In this regard, mapping component 410 can correlate information of the portable communication devices regarding a position, GPS position of the object, the other objects, e.g., to more accurately create map of objects 500, e.g., by averaging measurement values of reported distances of the object from respective portable communication devices to reduce uncertainty of GPS measurements.

In one embodiment, mapping component 410 can be configured to receive distance information representing distances of the object from geographic locations of other portable communication devices (e.g., 110, 610) and create, based on the distance information, map of objects 500. In this regard, mapping component 410 can correlate information of other devices regarding a GPS position of the object to more accurately create map of objects 500, e.g., averaging measurement values, averaging GPS determined positions, to reduce uncertainty of GPS measurements, to reduce uncertainty due to movement of objects, to reduce uncertainty due to temporarily located objects.

In another embodiment, mapping component 410 can be configured to determine an orientation, e.g., x-axis based orientation, y-axis based orientation, z-axis based orientation, of portable communications device 110, e.g., using accelerometer(s) (not shown), gyroscope(s) (not shown), of portable communications device 110, and build, based on the orientation, a 3-D map of the objects (not shown). In this regard, the 3-D map of objects can detail the height of structures, can detail openings within the structures.

In one embodiment, mapping component 410 can be configured to determine a direction of the reflection of the sound that has been reflected from the object, and build, based on the determined direction of the reflection of the sound, the 3-D map of the objects.

In yet another embodiment, mapping component 410 can be configured to utilize mapping data derived from other sources, e.g., building blueprints, to augment, modify map of objects 500, the 3-D map of objects. In an embodiment, mapping component 410 can be configured to augment, modify the mapping data, e.g., building blueprints, utilizing information from map of objects 500.

Figure 6:
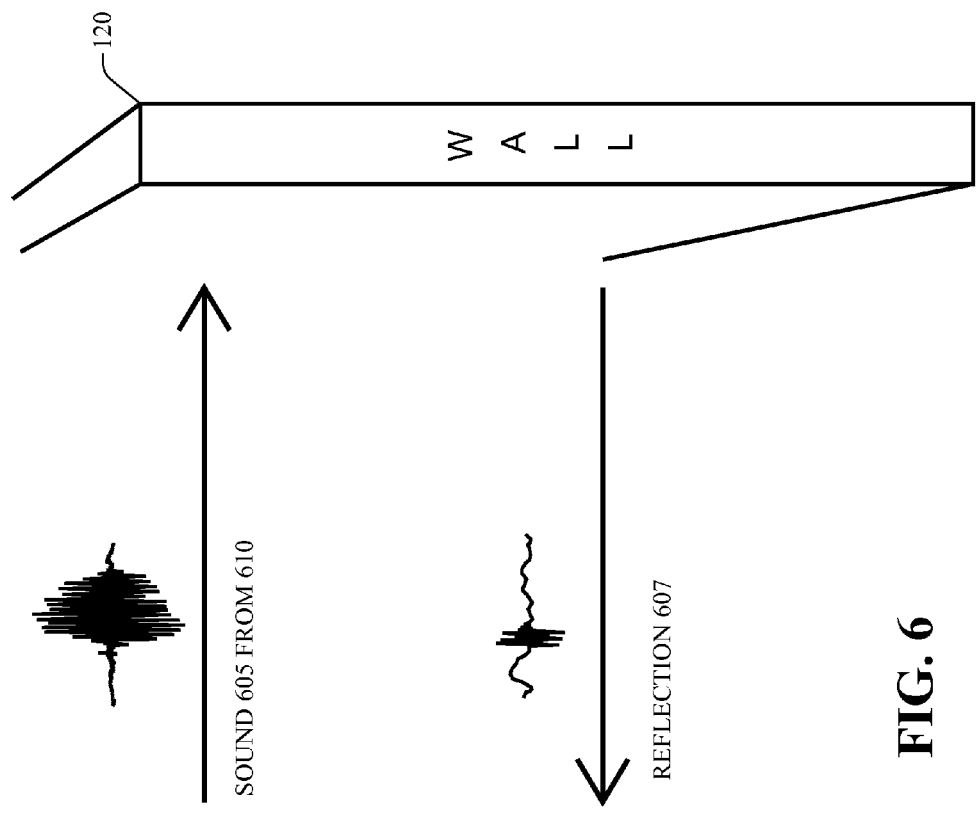
FIGS. 6-7 illustrate block diagrams of other sound based navigation environments, in accordance with various embodiments.
Figure 7:
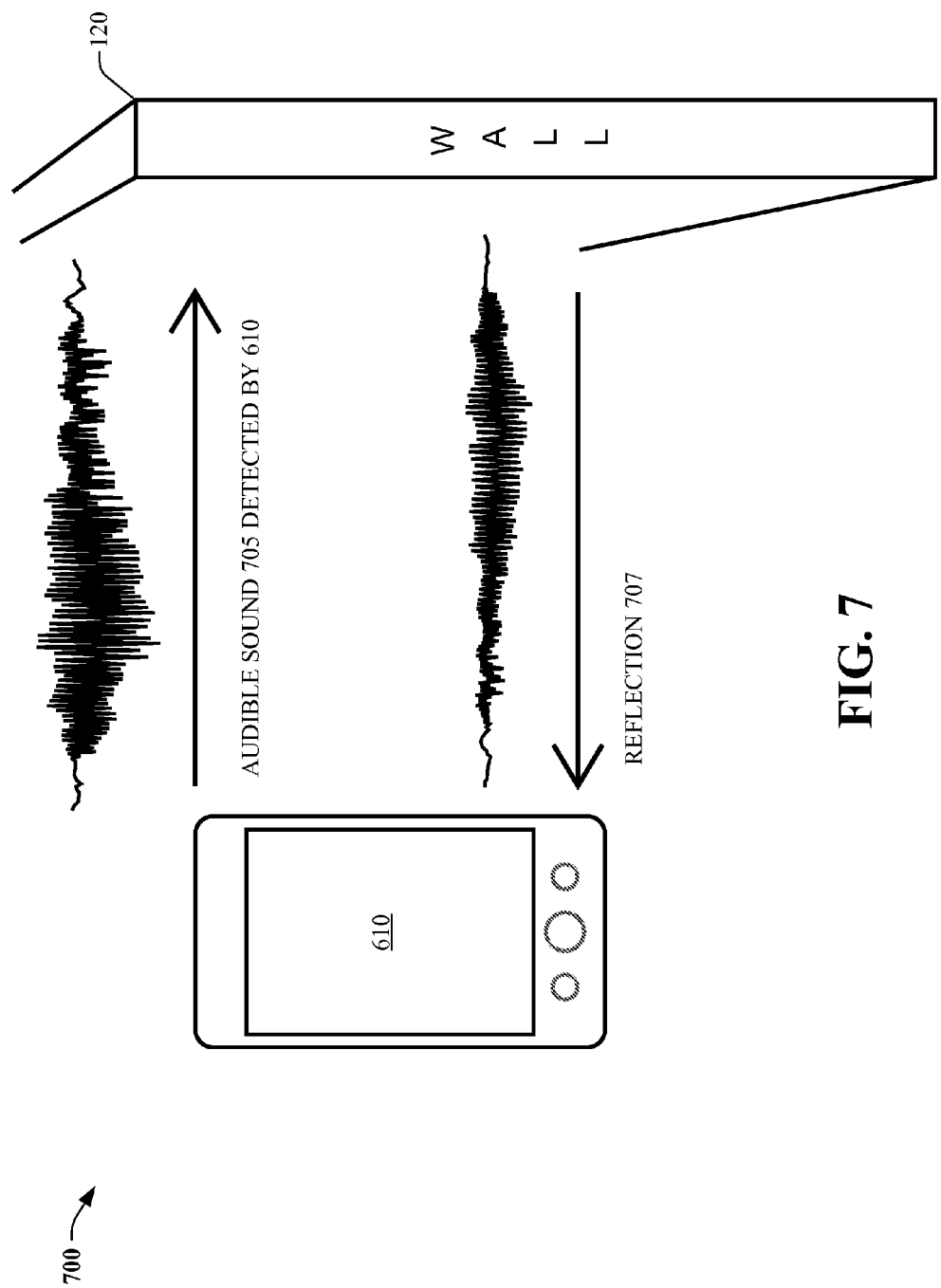
Figure 8:
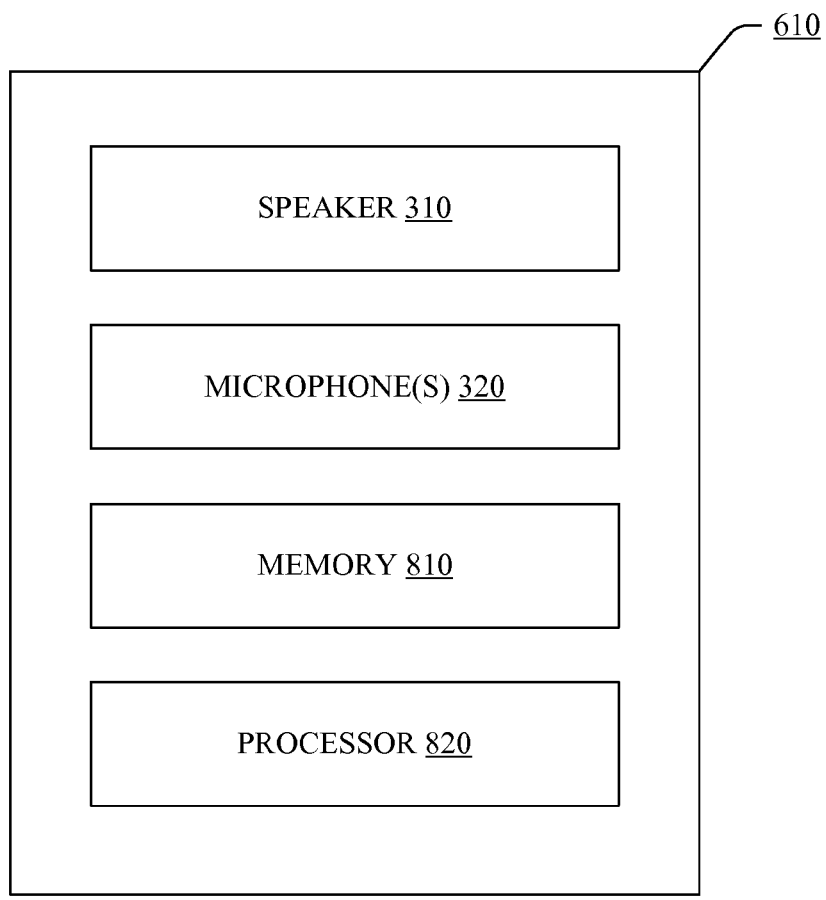
FIG. 8 illustrates a block diagram of another portable communications device, in accordance with various embodiments.

Now referring to FIGS. 6-8, block diagrams (600, 700, and 800) of other sound based navigation environments and another portable communication device are illustrated, respectively, in accordance with various embodiments. Portable communications device 610, e.g., wireless device, cellular device, smart phone, hand held device, includes speaker 310 for generating, emitting, transmitting sound 605, e.g., an ultrasonic sound, ultrasonic ping 105, including frequencies above a human audible range of frequencies (e.g., above 20,000 Hz), an audible sound, e.g., audible sound 205, ring, alarm, noise associated with a key press of the portable communication device, which is within the human audible range of frequencies (e.g., at or below 20,000 Hz), etc.

Further, portable communications device 610 includes memory 810 for storing executable instructions, and processor 820, coupled to memory 810, which facilitates execution of the executable instructions to perform operations. In this regard, the operations can include determining a transmit time that the sound that has been generated, emitted, transmitted, etc. by speaker 310, and/or a transmit time that another sound, e.g., audible sound 705, which has been generated, emitted, transmitted by a sound source (not shown) that is around, near, proximate to, etc. portable communications device 610, e.g., comprising human speech. In this regard, portable communications device 610 can determine the transmit time of audible sound 705 using microphone(s) 320 to detect the generation of audible sound 705.

In one embodiment, the operations can further include determining a receive time, arrival time that a reflection, early reflection, echo, acoustic wave (e.g., reflection 607, reflection 707) of the sound off of an object, e.g., wall 120, structure, plumbing, which has been received by microphone(s) 320, and determining, based on the transmit time and the receive time, a distance of the object from portable communications device 610.

In another embodiment, the operations can further include determining a geographic location of portable communications device 610, e.g., based on GPS information determined, based on GPS information received, by portable communications device 610, and creating, based on the geographical location and the distance of the object from portable communications device 610, a map of objects, e.g., map of objects 500, indoor map, of structures, e.g., walls, plumbing, appliances, comprising the object.

In yet another embodiment, the creating the map of objects can include determining an orientation, e.g., x-axis based orientation, y-axis based orientation, z-axis based orientation, of portable communications device 610, e.g., using accelerometer(s) (not shown), gyroscope(s) (not shown), of portable communications device 610, and building, based on the orientation, a 3-D map (not shown) of the objects. In this regard, the 3-D map of objects can detail the height of structures, openings within the structures.

In an embodiment, the creating the map of objects can include determining a direction of the reflection of the sound based on determined orientation of portable communications device 610, and building the 3-D map of the objects based on the determined direction of the reflection of the sound.

Figure 9:
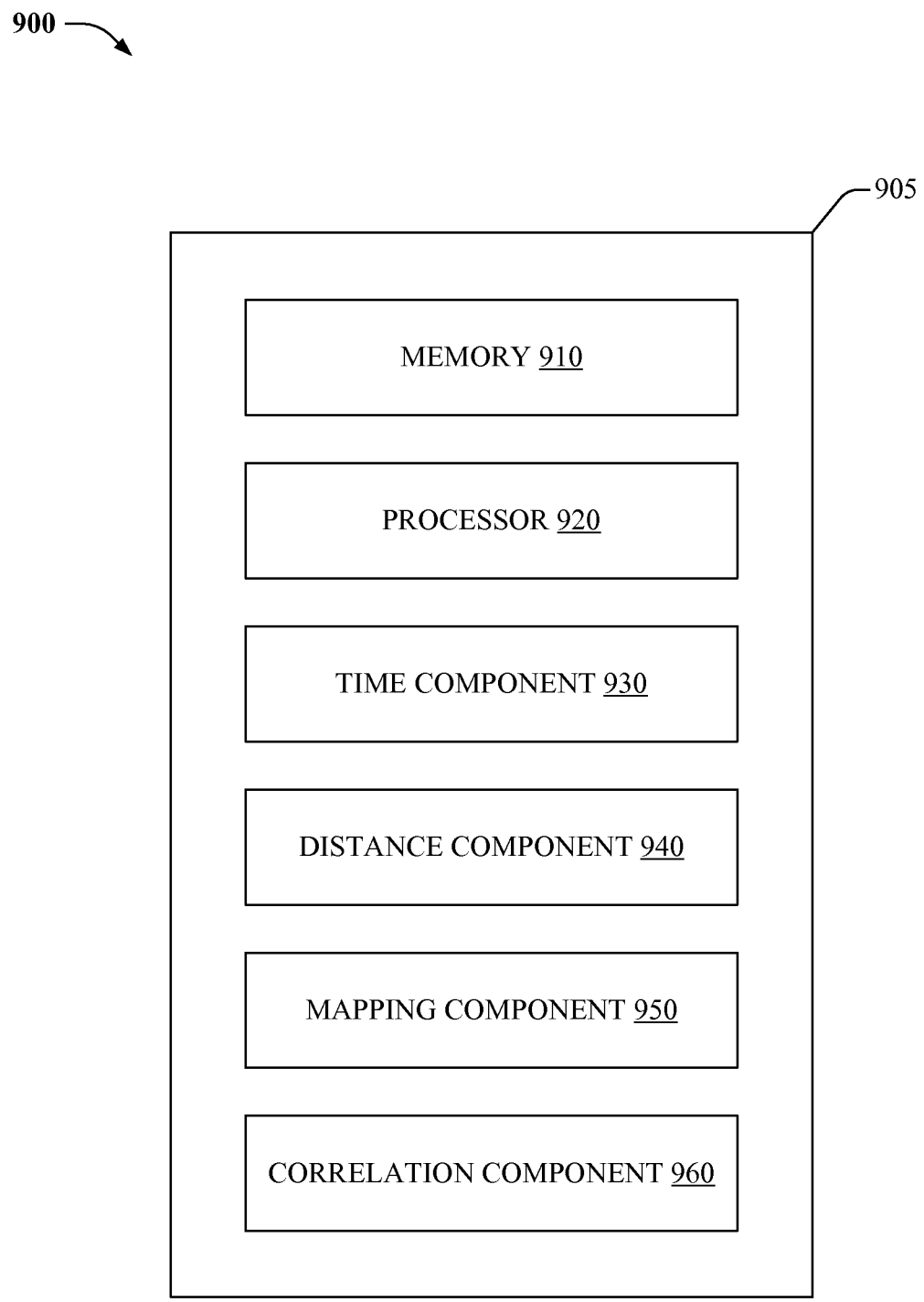
FIG. 9 illustrates a block diagram of a cloud-based system, in accordance with various embodiments.
Figure 10:
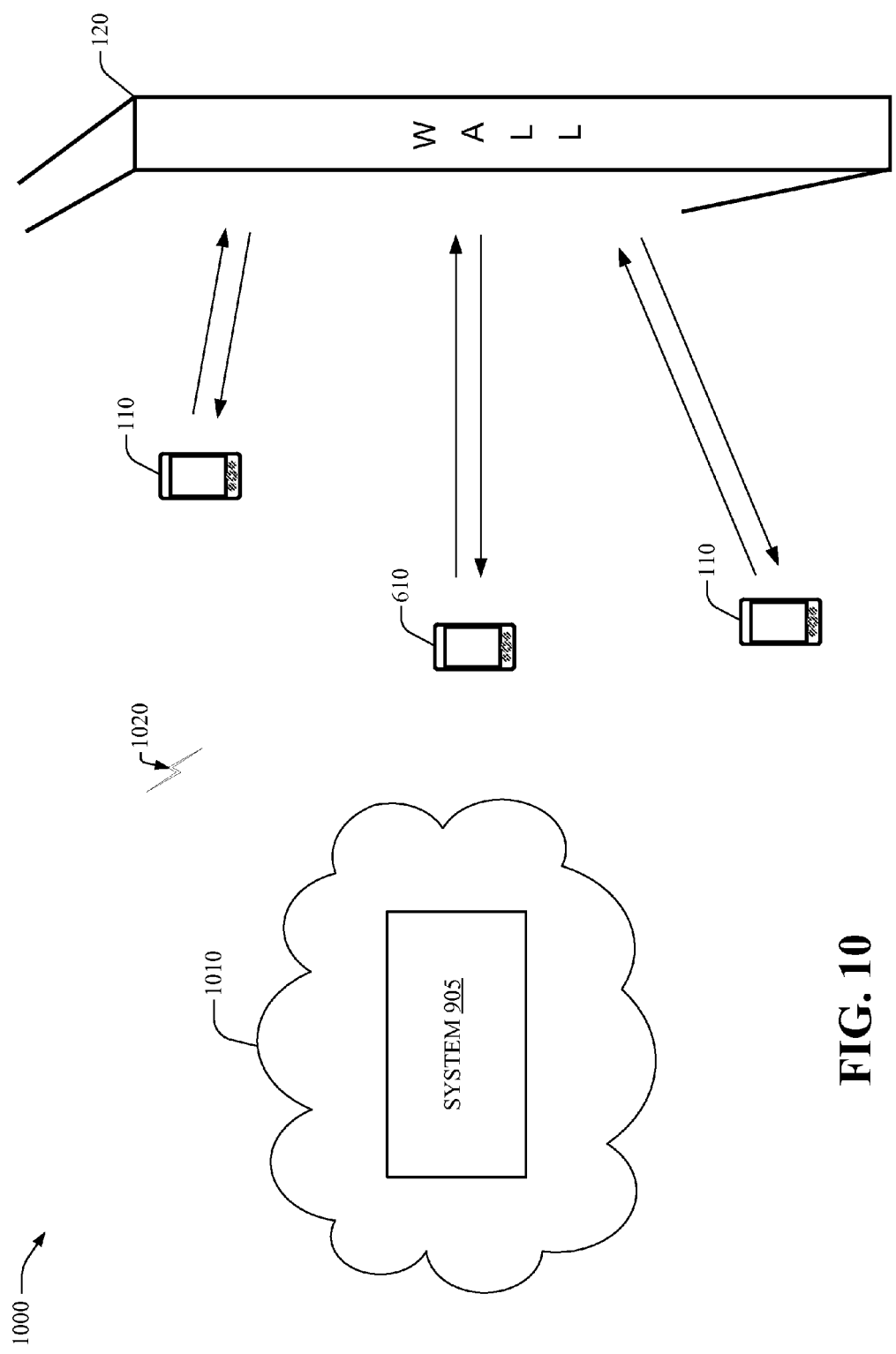
FIG. 10 illustrates a block diagram of a cloud-based navigation environment, in accordance with various embodiments.

Referring now to FIGS. 9-10, block diagrams (900 and 1000) of a cloud-based system (905) and a cloud-based navigation environment are illustrated, in accordance with various embodiments. Cloud-based system 905 can be included in communication network 1010, which can include any suitable mobile and/or wireline-based communication network including any suitable data packet-switched or combination data packet/circuit-switched communication network, wired or wireless IP network such as a VoIP network, an IP data network, a cellular telecommunication system, a universal mobile telecommunication system (UMTS) network, a general packet radio service (GPRS) network, a communication network that provide streaming data communication over IP and/or integrated voice and data communication over combination data packet/circuit-switched technologies.

In various aspects, cloud-based system 905 can be wirelessly coupled to a portable communications device, e.g., 110, 610, via wireless link 1020. Wireless link 1020 can be an over-the-air wireless link comprising a downlink (DL) and an uplink (UL) (both not shown) that can utilize a predetermined band of radio frequency (RF) spectrum associated with a cellular based network, e.g., a Global System for Mobile Communication (GSM) network, a Third Generation Partnership Project (3GPP) Long Term Evolution (LTE™) network, a UMTS network, a GPRS network. Accordingly, the portable communications device can be a cellular based device corresponding to such networks.

In various embodiments, cloud-based system 905 can communicate with the portable communications device via any number of various types of wireless technologies including, but not limited to, cellular, IEEE 802.11x (WiFi), Worldwide Interoperability for Microwave Access (Wi-MAX), wireless local area networks (WLAN), Femto, etc. Further, communication network 1010 can include one or more of the Internet (or another communication network (e.g., IP-based network)), or a digital subscriber line (DSL)-type or broadband network facilitated by Ethernet or other technology. In this regard, cloud-based system 905 can include a cloud-based communication platform, Internet platform, wide area network.

Similarly, one of ordinary skill in the art of sound based navigation technologies will appreciate that the portable communications device for systems, methods, and/or apparatus disclosed herein can include a mobile device, a mobile phone, a cellular communication device, a cellular phone, a satellite communication device, a satellite phone, a WiFi phone, a dual-mode cellular/WiFi phone, a combination cellular/WiFi/WiMAX phone, a portable computer, or any suitable combination thereof. In this regard, cloud-based system 905 can receive/send information, data, GPS information, information representing a transmission of a sound and a reflection of the sound, echo of the sound from/to the portable communications device.

As illustrated by FIG. 9, cloud-based system 905 includes memory 910 configured to store executable instructions, and processor 920, coupled to memory 910, that facilitates execution of the executable instructions to perform operations, e.g., utilizing time component 930 and distance component 940. In this regard, time component 930 can be configured to determine an emission time that a sound, e.g., comprising frequencies above a human audible range of frequencies (e.g., above 20,000 Hz), comprising frequencies within the human audible range of frequencies (e.g., within 20-20,000 Hz), has been generated, emitted, transmitted by a speaker of a portable communications device, e.g., 110, 610, and/or that has been generated, emitted, transmitted by a sound source (not shown) around, about, proximate to the portable communications device, and determine a reception time that a reflection, early reflection, echo of the sound off of an object, e.g., wall 120, object 510, object 520, object 530, object 540, a structure, has been received by the portable communications device. Further, distance component 940 can be configured to determine, based on the emission time and the reception time, a distance of the object from the portable communications device. In an embodiment, time component 930 can receive, e.g., via wireless link 1020, information corresponding to, representing the emission time and the reception time from the portable communications device.

In one embodiment, cloud-based system 905 can include mapping component 950, which can be configured to determine a geographic location of the portable communications device, e.g., based on GPS information determined, based on GPS information received, by mapping component 950, and create, based on the geographic location and the distance of the object from the portable communications device, a map of objects, e.g., map of objects 500, indoor map, of structures, e.g., walls, plumbing, appliances, comprising the object.

In another embodiment, mapping component 950 can be configured to determine an orientation, e.g., x-axis based orientation, y-axis based orientation, z-axis based orientation, of the portable communications device, e.g., using data from accelerometer(s) (not shown), gyroscope(s) (not shown), of the portable communications device, and build, based on the orientation, a 3-D map (not shown) of the objects. In this regard, the 3-D map of the objects can detail the height of structures and/or detail openings within the structures.

In one embodiment, mapping component 950 can be configured to determine a direction of the reflection of the sound off of the object based on the determined orientation, and build, based on the determined direction of the reflection, the 3-D map of the objects.

In yet another embodiment, mapping component 950 can be configured to utilize mapping data derived from other sources, e.g., building blueprints, to augment, modify the map of objects, the 3-D map of objects. In an embodiment, mapping component 950 can be configured to augment, modify the mapping data, e.g., building blueprints, utilizing information from, e.g., the map of objects, 3-D map of objects.

In another embodiment, cloud-based system 905 can include correlation component 960 that can be configured to receive location information, e.g., GPS based information, representing geographical locations of portable communication devices, e.g., 110, 610, wireless device(s), cellular device(s), smart phone(s), hand held device(s). Further, correlation component 960 can be configured to receive distance information representing respective distances of the portable communication devices from the object. In this regard, correlation component 960 can derive, determine correlated data referencing an average GPS location, position of the object based on the respective distances of the portable communication devices from the object, e.g., reducing uncertainty of GPS measurements, reducing uncertainty due to movement of objects, reducing uncertainty due to temporarily located objects. Further, mapping component 950 can be configured to create the map of the objects based on the location information and the correlated data.

Figure 11:
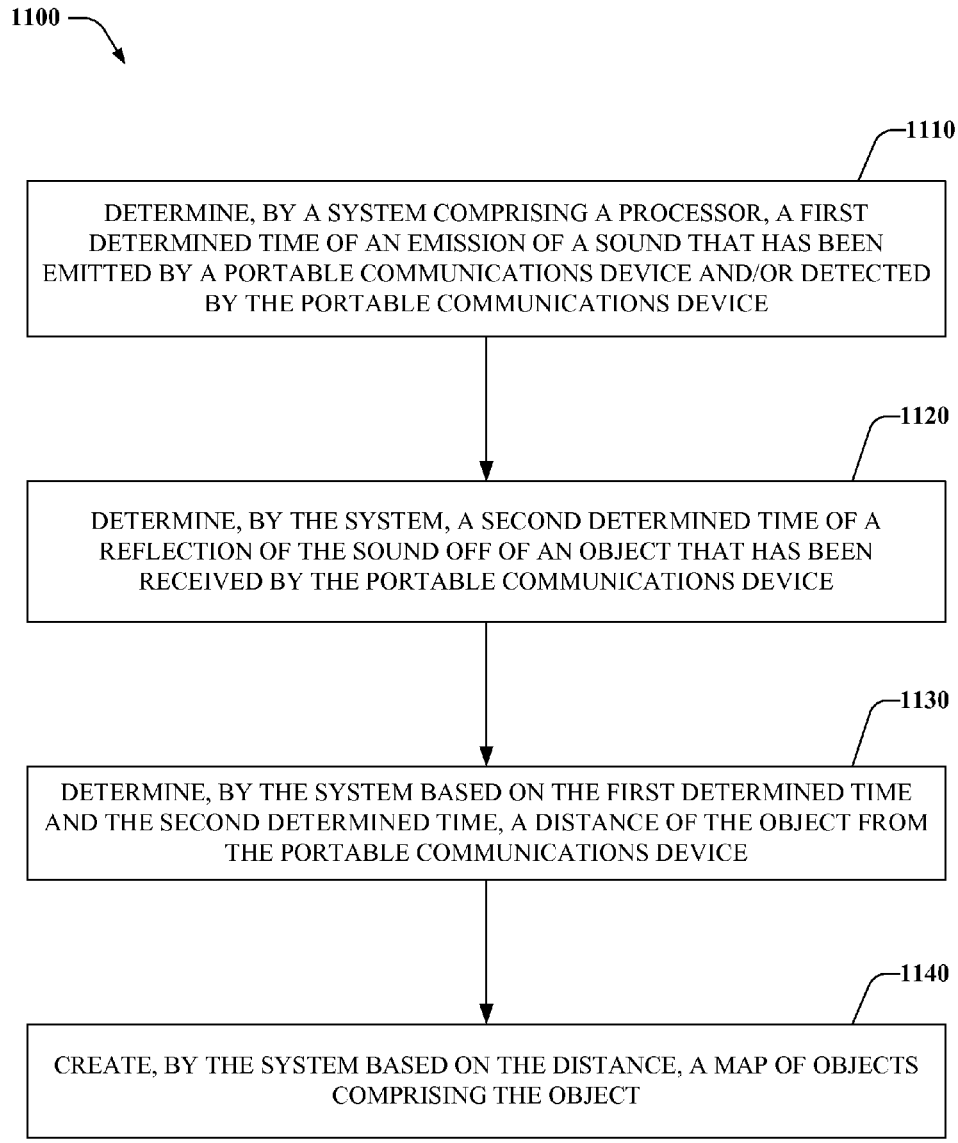
FIGS. 11-12 illustrate flow diagrams of method(s) corresponding to sound based navigation environment(s), in accordance with various embodiments.
Figure 12:
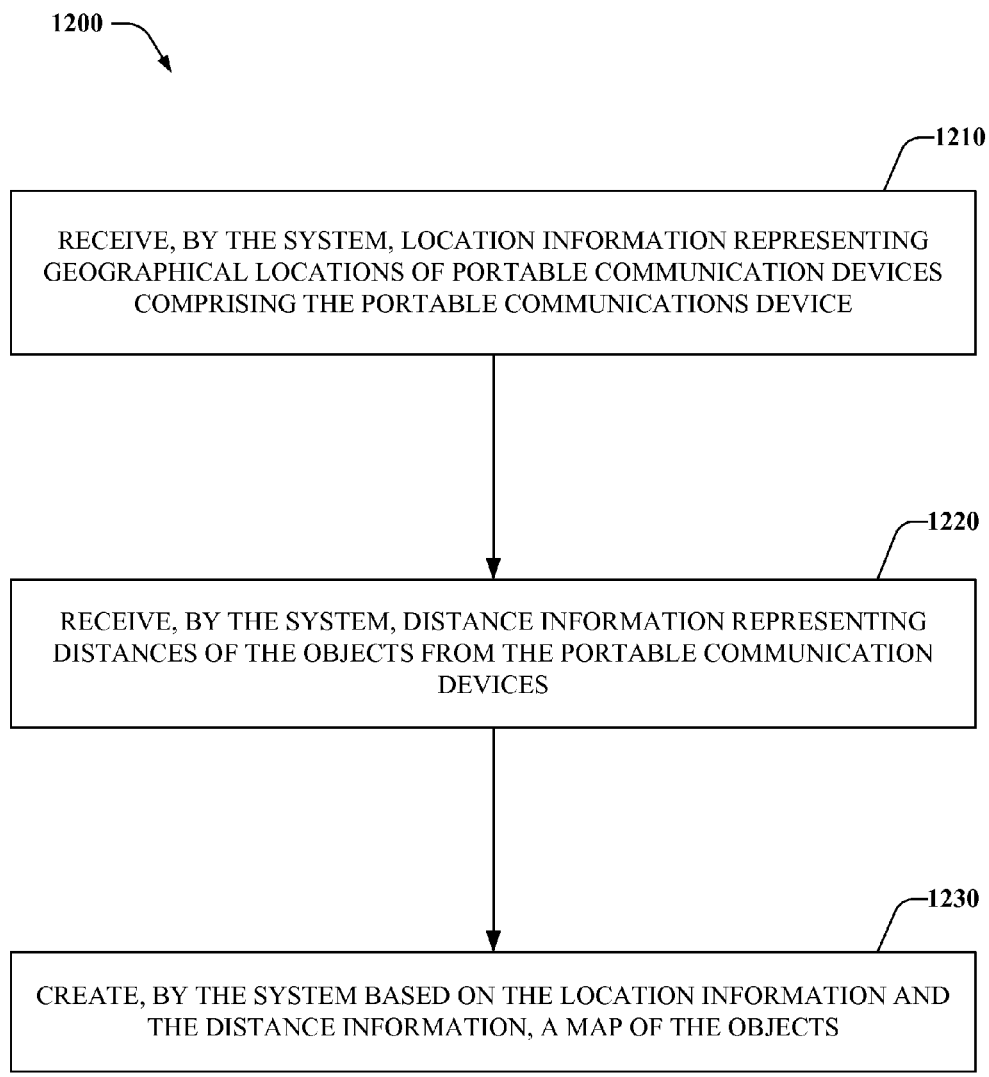

Referring now to FIGS. 11-12, flow diagrams (1100 and 1200) of method(s) corresponding to sound based navigation environment(s) are illustrated, in accordance with various embodiments. The order in which some or all of the process blocks appear in FIGS. 11-12 should not be deemed limiting. Rather, it should be understood by a person of ordinary skill in sound based navigation technologies having the benefit of the instant disclosure that some of the process blocks can be executed in a variety of orders not illustrated.

At 1110, a first determined time of an emission of a sound, comprising frequencies above a human audible range of frequencies, within the human audible range of frequencies that has been emitted by a portable communications device, e.g., wireless device, cellular device, smart phone, hand held device, 110, 610, and/or detected by the portable communications device (e.g., via microphone(s) of the portable communications device), e.g., the sound generated, emitted by a sound source, e.g., person, around, near, proximate to, the portable communications device, can be determined by a system, e.g., 905.

At 1120, a second determined time of a reflection, early reflection, echo of the sound off of an object, e.g., wall 120, object 510, object 520, object 530, object 540, structure, plumbing, which has been received by the portable communications device can be determined by the system. At 1130, a distance of the object from the portable communications device can be determined by the system based on the first determined time and the second determined time. At 1140, a map of objects, e.g., map of objects 500, indoor map, of structures, e.g., plumbing, appliances, comprising the object can be created by the system based on the distance.

Now referring to FIG. 12, at 1210, location information, e.g., GPS based information, representing geographic locations of portable communication devices comprising the portable communication device can be received by the system. At 1220, distance information representing distances of the objects from the portable communication devices can be received by the system. At 1230, a map of objects, e.g., map of objects 500, indoor map, of structures, e.g., plumbing, appliances, comprising the object can be created by the system based on the location information and the distance information. In this regard, information of other devices regarding a GPS position of the object can be correlated to more accurately create the map of objects, e.g., averaging measurement values, averaging GPS determined positions, to reduce uncertainty of GPS measurements, to reduce uncertainty due to movement of objects, to reduce uncertainty due to temporarily located objects.

In another embodiment (not shown), an orientation, e.g., x-axis based orientation, y-axis based orientation, z-axis based orientation, of the portable communications device can be determined by the system, e.g., using accelerometer(s), gyroscope(s), of the portable communications device. Further, a 3-D map of objects can be built by the system based on the orientation. In an embodiment (not shown), a direction of the reflection, early reflection, echo of the sound off of the object that has been received by the portable communications device can be determined by the system based on the determined orientation. Further, the 3-D map of objects can be built by the system based on the determined direction of the reflection.

In yet another embodiment (not shown), the map of objects, the 3-D map of objects can be augmented, modified by the system utilizing mapping data derived from other sources, e.g., building blueprints. In an embodiment, the mapping data, e.g., building blueprints, can be augmented, modified by the system utilizing information from, e.g., the map of objects, the 3-D map of objects.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A portable communications device, comprising:
   a speaker for generating a sound;
   at least one microphone for receiving a reflection of the sound, wherein the reflection comprises an acoustic wave that has been reflected from an object;
   a timing component configured to determine a time of propagation of the acoustic wave from the speaker to the at least one microphone;
   a distance component configured to determine a determined distance of the object from the portable communications device based on the time of propagation of the acoustic wave; and
   a mapping component configured to:
      receive distance information representing respective distances of the object from geographical locations of other portable communication devices; and
      create, based on the determined distance of the object from the portable communications device and the distance information representing the respective distances of the object from the geographical locations of the other portable communication devices, a map comprising the object.

2. The portable communications device of claim 1, wherein the timing component is further configured to:
   send first information associated with a generation of the sound and the reflection of the sound directed to a system of a communication network;
   receive, based on the first information, second information from the system; and
   determine, based on the second information, the time of propagation of the acoustic wave.

3. The portable communications device of claim 1, wherein the mapping component is further configured to:
   determine a geographic location of the portable communications device; and
   create, based on the geographic location, the map.

4. The portable communications device of claim 1, wherein the mapping component is further configured to:
   based on the distance information, determine correlated data referencing an average determined global positioning system (GPS) location of the object; and
   create, based on the correlated data, the map.

5. The portable communications device of claim 1, wherein the sound comprises ultrasonic sound comprising frequencies above a human audible range of frequencies.

6. The portable communications device of claim 1, wherein the sound comprises frequencies within a human audible range of frequencies.

7. A portable communications device, comprising:
a speaker;
a microphone;
a memory to store executable instructions; and
a processor, coupled to the memory, that facilitates execution of the executable instructions to perform operations comprising:
   determining a transmit time at which a sound has been generated by at least one of the speaker or sound source around the portable communications device;
   determining a receive time at which a reflection of the sound off of an object has been received by the microphone;
   determining, based on the transmit time and the receive time, a distance of the object from the portable communications device;
   receiving information representing respective distances of the object from other portable communication devices; and
   based on the distance of the object from the portable communications device and the information representing the respective distances of the object from the other portable communication devices, creating a map comprising the object.

8. The portable communications device of claim 7, wherein the determining the transmit time comprises determining, using the microphone, a time that the sound has been generated by the sound source.

9. The portable communications device of claim 7, wherein the determining the transmit time comprises determining, using the processor, a time that the sound has been generated by the speaker.

10. The portable communications device of claim 7, wherein the sound comprises ultrasonic sound comprising frequencies above a human audible range of frequencies.

11. The portable communications device of claim 7, wherein the sound comprises frequencies within a human audible range of frequencies.

12. The portable communications device of claim 7, wherein the creating the map comprises:
   determining a geographic location of the portable communications device; and
   based on the geographical location creating the map.

13. The portable communications device of claim 7, wherein the creating the map comprises:
   determining an orientation of the portable communications device; and
   based on the orientation, creating a three-dimensional map.

14. The portable communications device of claim 13, wherein the operations further comprise:
   determining, based on the orientation, a direction of the reflection of the sound.

15. The portable communications device of claim 13, further comprising:
   at least one accelerometer, wherein the determining the orientation comprises determining the orientation utilizing the at least one accelerometer.

16. A system, comprising:
a memory to store executable instructions; and
a processor, coupled to the memory, that facilitates execution of the executable instructions to perform operations, comprising:
   determining an emission time that a sound has been generated by at least one of a speaker of a portable communications device or a sound source around the portable communications device;
   determining a reception time that a reflection of the sound off of an object has been received by the portable communications device;
   determining, based on the emission time and the reception time, a derived distance of the object from the portable communications device;
   receiving distance information representing respective distances of other portable communication devices from the object; and
   based on the derived distance of the object from the portable communications device and the distance information representing the respective distances of the other portable communication devices from the object, creating a map comprising the object.

17. The system of claim 16, wherein the creating the map comprises:
   determining a geographic location of the portable communications device; and
   creating, based on the geographic location, the map.

18. The system of claim 16, wherein the creating the map comprises:
   receiving location information representing geographical locations of the other portable communication devices; and
   creating the map based on the location information.

19. The system of claim 16, wherein the operations further comprise
   receiving information corresponding to the emission time and the reception time from the portable communications device.

20. The system of claim 16, wherein the sound comprises ultrasonic sound comprising frequencies above a human audible range of frequencies.

21. The system of claim 16, wherein the sound comprises frequencies within a human audible range of frequencies.

22. A method, comprising:
   determining, by a system comprising a processor, a first determined time of an emission of a sound that has been at least one of emitted by a portable communications device or detected by the portable communications device;
   determining, by the system, a second determined time of a reflection of the sound off of an object that has been received by the portable communications device;
   determining, by the system, based on the first determined time and the second determined time, a determined distance of the object from the portable communications device;
   receiving, by the system, distance information representing respective distances of other portable communication devices from the object; and
   based on the determined distance of the object from the portable communications device and the distance information representing the respective distances of the other portable communication devices from the object, creating, by the system, a map comprising the object.

23. The method of claim 22, wherein the creating the map comprises:

receiving location information representing respective geographical locations of the other portable communication devices; and creating, by the system based on the location information, the map.

24. The method of claim 22, wherein the sound comprises at least one of non-audible frequencies above a human audible range of frequencies or audible frequencies within the human audible range of frequencies.

\* \* \* \* \*